United States Patent
Tada et al.

(10) Patent No.: US 6,586,037 B1
(45) Date of Patent: Jul. 1, 2003

(54) METHOD FOR IMPROVING GELLING PROPERTIES OF PROTEIN

(75) Inventors: Mikiro Tada, 1-3-1-102, Tushimanaka, Okayama-shi, Okayama 700-0082 (JP); Kazushi Sakaue, Osaka (JP); Toru Hayashi, Ushiku (JP); Setsuko Suzuki, Tsukuba (JP)

(73) Assignees: Director of National Food Research Institute, Ministry of Agriculture, Forestry and Fisheries, Ibaraki (JP); Mikiro Tada, Okayama (JP); San-Ei Gen F.F.I., Inc., Osaka (JP)

( * ) Notice: Subject to any disclaimer, the term of this patent is extended or adjusted under 35 U.S.C. 154(b) by 0 days.

(21) Appl. No.: 09/913,648

(22) PCT Filed: Dec. 9, 1999

(86) PCT No.: PCT/JP99/06931

§ 371 (c)(1),
(2), (4) Date: Nov. 14, 2001

(87) PCT Pub. No.: WO00/48472

PCT Pub. Date: Aug. 24, 2000

(30) Foreign Application Priority Data

Feb. 19, 1999 (JP) .............................. 11-41594

(51) Int. Cl.$^7$ .................................................. A23J 1/00
(52) U.S. Cl. .................... 426/656; 426/240; 426/614
(58) Field of Search ................ 426/614, 656, 426/240

(56) References Cited

U.S. PATENT DOCUMENTS 5,700,504 A * 12/1997 Hale, Jr.

FOREIGN PATENT DOCUMENTS

| JP | 402242641 | * | 9/1990 |
| JP | 339033 | | 2/1991 |
| JP | 6327447 | | 11/1994 |
| JP | 716085 | | 1/1995 |

* cited by examiner

Primary Examiner—Anthony J. Weier
(74) Attorney, Agent, or Firm—Birch, Stewart, Kolasch & Birch, LLP

(57) ABSTRACT

The present invention provides a method for improving gelation properties of protein by irradiation of the protein with an electron beam, in particular, a method of improving the gelation properties of the protein by raising a gelation temperature of the protein higher than an inherent gelation temperature or increasing a ratio of the protein to be gelated.

17 Claims, No Drawings

METHOD FOR IMPROVING GELLING PROPERTIES OF PROTEIN

This application is the national phase under 35 U.S.C. §371 of PCT International Application No. PCT/JP99/06931 which has an International filing date of Dec. 9, 1999, which designated the United States of America and was not filed in English.

TECHNICAL FIELD

The present invention relates to a method for improving gelation properties of protein through electron beam irradiation.and the protein treated by the method, as well as a method for gelating the protein whose gelation properties have been improved by the electron beam irradiation and a product containing the protein treated by these methods.

BACKGROUND ART

Denaturation of protein is caused by heat, denaturants such as guanidine hydrochloride and urea, or organic solvents such as ethanol which destroy a stereostructure of the protein. For example, the denaturation by heating causes change in the stereostructure at secondary, tertiary or quaternary level without destruction of a peptide linkage contained in its primary structure and aggregates the denaturated molecules to regularly form a network structure of the protein.

Such a phenomenon can be defined as gelation, which seems to be caused by interaction between the proteins.

Accordingly, for food using albumen, sugar or sugar alcohol is added to raise a denaturating temperature of the. protein, or salts such as sodium salt are added for salting-out in order to prevent the denaturation by heat during manufacturing processes. Further, other methods are employed, for example, a method of removing excess ions and calcium ions as contaminants by demineralization to obtain a clear protein solution, or a method of removing metal salts by using a chelating agent such as a citrate or a polyphosphate for preventing the denaturation. However, these methods do not change the nature of the protein itself but merely control the environmental conditions to adjust the gelation caused by heating.

The protein denatured by heat and thus gelated shows various functional properties, e.g., improvement of viscoelasticity, water absorptivity, consistency, linkage and adherence between particles, as well as stable emulsification and foaming. Therefore, the gelation of the protein plays an important role in manufacturing food such as dairy products, solidified albumen, gelatin protein, thermally-solidified products such as ground meat or fish, soybean protein, plant protein produced by extrusion or fiberization, bread dough and the like.

Regarding whey protein, soybean protein, plasma protein and casein micelle, enhancement of gelation speed and strength of the gel is carried out by adding a calcium salt, an enzyme such as transglutaminase, a gelation agent and a thickener for adjusting the gelation such as carrageenan, gellan gum and xanthan gum, or locust bean gum. Further, the gelation is also performed by first alkalinizing the protein and then neutralizing it or adjusting pH thereof to an isoelectric point.

Also known is a method for treating the protein with radiation and the like (Japanese Unexamined Patent Publications Nos. HEI 6(1994)-327447 and HEI 7(1995)-16085). However, these methods are directed to sterilization, so that there are no observation about improvement of properties of the protein, in particular the gelation properties.

Accordingly, what is demanded is a convenient method for treating the protein to improve the gelation properties of the protein and to give the protein functional properties exhibited by gelation.

DISCLOSURE OF INVENTION

As a result of eager researches to solve the above-mentioned problems, the inventors of the present invention have found that irradiation of the protein with an electron beam improves the gelation properties of the protein. In particular, they have found that a protein exhibiting gelation temperature rose higher than an inherent gelation temperature or ratio of the protein to be gelated increased greater than an inherent ratio can be obtained.

Thus, according to the present invention, provided is a method for improving gelation properties of protein through electron beam irradiation and the protein treated by the method, as well as a method for gelating the protein whose gelation properties have been improved by the electron beam irradiation and a product containing the protein treated by these methods.

BEST MODE FOR CARRYING OUT THE INVENTION

According to the present invention, the protein to be irradiated with the electron beam is not particularly limited as long as it is a protein having gelation properties. Examples of the protein include whole egg, albumen, yolk, ovalbumin, ovoglobulin, soybean flour, soybean protein, wheat flour, wheat protein, wheat glutenin, plasma protein, a concentrate of whey protein, lactoglobulin, taurine, collagen, betaine, mutasteine, ice nucleation protein, lactoferrin, sepia, gelatin, rennet casein, α s 1-casein, β-casein, lysozyme, hemoglobin, myoglobin, prealbumin, avidin, monellin, milaclin, fibrous protein, mucin, lectin, prothrombin, glycoprotein, myelin basic protein, oxytocin, adrenal cortex and the like. Among them, the albumen, plasma protein, concentrate of whey protein and gelatin are preferable.

The protein may be mixed with a material of a product finally containing protein in the manufacturing or processing step thereof, i.e., the protein may contain various other components.

Examples of the product utilizing the protein during the manufacturing or processing step may be food such as livestock products (ham, sausage, salami, sweet-and-sour-pork, roast pork, broiled pork innards, meatball, corned beef, liver paste, hamburger steak), marine products (Kamaboko, Hanpen, fish paste, ingredients of Oden, oiled tuna), agricultural products (deli, Sukiyaki, fried Tofu with hot meat sauce, stew, curry, meat sauce, soup), dairy products (condensed milk, soya milk, cheese, yogurt, various kinds of modified milk products), egg products (mayonnaise, Dashi-maki omelet, custard pudding, marshmallow, mousse, meringue, Chawan-mushi), cream filled in buns, whipped cream, shake, desserts (milk pudding, flan, sweet red-bean soup), frozen sweets (ice cream) and frozen products (frozen foods, frozen cakes), fruit products (jam, candied chestnuts), beverages (juice, coffee-flavored milk, carbonated drink, soft drink, water-like beverage, nutritional drink, functional drink), noodle products (snack noodles, Chinese noodles), wheat flour products (flour for Okonomi-Yaki), soybean products, retort-packed products, hot pack products, products subjected to immersion in boiling water, UHT (ultra high temperature sterilization), HTST (high temperature short time sterilization), high pressure treatment and aseptic packaging. Further, the protein can also be applied to various fields including medical supplies such as toothpaste, mouth care products and mouthwash, quasi drug, feed, film industry and cosmetics.

The method of the present invention is realized by irradiating the protein with an electron beam. In general, the electron beam is generated by an electron beam generating machine. For ex ample, a linear electron accelerator, a van de Graaff's electron accelerator, an area beam type or Cockcroft-Walton's electron beam generating machine and the like are usable.

For the electron beam irradiation, an acceleration voltage to be applied to the electron beam is in the range of 50 KeV to 10 MeV, preferably 300 KeV to 5 MeV, more preferably 300 KeV to 2.5 MeV. With an electron beam applied with an acceleration voltage of less than 50 KeV, expected effects cannot be obtained. Use of an electron beam applied with an acceleration voltage of higher than 10 MeV to food products is prohibited.

In the context of the present invention, dose rate of the electron beam is in the range of $1.0 \times 10^5$ to $1.0 \times 10^9$ Gy/hr.

The protein to be irradiated with the electron beam may be in any of dried state or dispersed state in water, but preferably is in dried state in the form of film, plate, particles or powders in order to perform sufficient irradiation of the electron beam. In the case of irradiating the protein dispersed in water with the electron beam, the protein may be solidified, if required, by spray-drying, drum-drying, or hot air-drying after the irradiation.

The electron beam irradiation can be performed directly or indirectly to the protein. For example, in the case of the protein in the form of particles or powders, the irradiation may be performed to the particles or the powders contained in a plastic vessel, preferably a polyethylene bag having a thickness of 80 $\mu$m and capable of transmitting the electron beam. The thickness of the protein in the plastic bag may suitably be controlled depending on specific gravity of the protein, desirably the thickness is 5 to 10 mm for easy irradiation.

The electron beam irradiation can be performed in the presence of air in an open system, or in the presence of air, oxygen gas or nitrogen gas in a closed system. Water or alcohol such as ethanol may exist.

The inventors of the present invention have found that the above-mentioned electron beam irradiation improves the gelation properties of the protein. In particular, they have found that a gelation temperature of the protein is raised higher than an inherent gelation temperature or a ratio of the protein to be gelated is increased greater than an inherent ratio through the irradiation.

For example, where a whey protein concentrate which is gelated under heating and gelatin which is gelated under cooling are irradiated with the electron beam, the gelation temperatures of them increase higher than their inherent gelation temperatures under the same conditions, respectively. Further, through the electron beam irradiation to albumen which is gelated under heating, a property to be gelated in the course of cooling after heating is given to the albumen. The gelation temperature thereof is raised higher than its inherent gelation temperature under heating. In the case of plasma protein, a ratio of the protein to be gelated increases greater than an inherent ratio thereof. That is, "gelation temperature" in this context signifies a temperature at which the protein is gelated and "a ratio of the protein to be gelated" signifies a ratio of protein molecules having the gelation properties with respect to the whole protein molecules. Further, the term "inherent" used for the gelation temperature and the ratio indicates the temperature and the ratio of a protein which is not subjected to the electron beam irradiation measured under the same conditions of purity, composition ratio, size of particles and the like as those of the irradiated protein.

The protein irradiated with the electron beam according to the method of the present invention shows the thus changed gelation temperature, so that lumpiness and viscosity particular to gelation are not observed and the protein is easily handled at the inherent gelation temperature. Further, with the thus increased protein ratio to be gelated, water content of the protein increases so that products of good water retention are provided. In particular, processed foods such as ham, sausages, fish meat balls and the like will show good yield because protein powders used as a material thereof can easily be handled by irradiating the electron beam. Further, for beverages containing the protein, thermal stability of the protein improves, which prevents floating of aggregates and lumpy feeling when swallowed. Thus, a thick substance having consistency or a substance of good foaming properties is obtained. In the same manner, for a custard pudding, an addition amount of a thermostable protein is optionally controlled to give desired gel strength, which allows manufacture of products with good emulsifying property.

Further, the protein eliminates the use of enzymes, thickening polysaccharides such as carrageenan that have been utilized for the gelation, as well as sugars, salts and chelating agents that have been added for controlling the thermal denaturation. Accordingly, the use of an excessive amount of additives is avoided. The electron beam irradiation according to the present invention does not inhibit the action of these additives so that they may be used in the method of the present invention. The use of the additives combined with the method of the present invention further ensures the control of the gelation and the thermal denaturation.

Mechanism of the above-described change in the gelation properties of the protein through the electron beam irradiation is unknown. However, in the case of the albumen, a higher order structure comprising hydrogen bonds and hydrophobic bonds of the molecules is undone by heating, and hydrophobic amino acid residues located inside in a natural state are exposed to the.surface to associate the molecules. Further, free SH groups in the molecules are activated to form SS bonds, and water molecules are taken in the inside of the structure by hydrophilic dissociable groups on the molecular surface. In consideration of the fact that the above-mentioned matters are known as phenomena of the gelation, it is assumed that, in the present invention, a state of hydrophilic groups or hydrophobic groups is changed through the electron beam irradiation according to any of the above-mentioned mechanisms, which varies the temperature range causing the protein gelation, a time point at which the protein gelation occurs and the strength of the gel. The electron beam irradiation at an absorbed dose of 1 kGy, for example, gives energy of 1J per kg of the protein. Therefore, it is also assumed that energy absorbed in aromatic amino acid or the like excites the amino acid to provide a more stable quasi-excited structure.

The protein irradiated with the electron beam can be gelated according to a method commonly known in the art to provide a protein gel having the above-mentioned properties.

In the present invention, physical changes such as a change in the gelation temperature of the protein are measured by differential scanning calorimeter (DSC) to confirm a molecular change in the protein and a variation in its state. According to the analysis, the change of the gelation temperature is recognized to have a tendency to increase depending on an absorbed dose of the irradiated electron beam. Further, the irradiated protein shows no significant difference in appearance, state and taste as compared with an unirradiated protein. A protein gelated after the electron beam irradiation exhibits taste and texture equal to or better than the unirradiated protein. The obtained gel does not show bad taste and smell, or uncomfortable changes.

EXAMPLES

Hereinafter, the present invention will be described in detail by way of examples, but the invention is not limited thereto.

Example 1

Powders of a whey protein concentrate (produced by Saneigen F. F. I., Inc., Lot No. 980605, containing 79.6 wt % of protein) were put in a polyethylene bag (140 mm height×140 mm width×0.08 mm thickness) and spread thinly to have a thickness of 5 mm. Electron beam irradiation was performed in the presence of air. A van de Graaff's electron accelerator (manufactured by Nisshin High Voltage Co. Ltd.) was used for the irradiation. The irradiation was performed at an acceleration voltage of 2.5 MeV (a dose rate of $1.5 \times 10^6$ Gy/hr). An absorbed dose was 25 kGy at a relative depth of 80% from the surface (current flow: 32.1 mA; rate: 50 m/min; irradiation range: 20 cm). The absorbed dose was confirmed by using a cellulose triacetate dosemeter.

A. Differential Scanning Calorimeter (DSC)

Samples irradiated with the electron beam and unirradiated samples were subjected to a temperature rise from 0° C. to 100° C. (heating condition) to measure variation in enthalpy and a temperature at a gelation peak under the conditions described below. The enthalpy variation was calculated from an area of the obtained heat capacity graph. Measurement apparatus: Micro DSC III (manufactured by SETARAM), weight of sample: about 1000 mg; protein concentration: 2 wt %; heating rate: 1° K/min, temperature range: 283° K to 373° K (10° C. to 100° C.).

The temperature at the gelation peak signifies a temperature at a peak observed in the heat capacity graph drawn with time (second) as a lateral axis and heat flow (mW) as a vertical axis.

The results are shown in Table 1.

TABLE 1

| Acceleration voltage (MeV) | Absorbed dose (kGy) | Under heating | |
|---|---|---|---|
| | | Enthalpy (J/g) | Temperature (° C.) |
| Unirradiated | | −177.6 | 34.1 |
| 2.5 | 25 | −0.4 | 85.5 |

The results show that the gelation temperature increased by about 50° C. through the electron beam irradiation.

Thus, the electron beam irradiation provided powders of the whey protein concentrate which is hardly influenced by heating and capable of avoiding gelation, solidification and separation at the inherent gelation temperature.

Example 2

Powders of alkalized gelatin derived from beef bone (produced by Saneigen F. F. I., Inc., Lot No. 980909, containing 88.9 wt % of protein) were used as a test material and treated in the same manner as in Example 1.

A. Differential Scanning Calorimeter (DSC)

Samples irradiated with the electron beam and unirradiated samples were subjected to a temperature decrease from 100° C. to 0° C. (cooling condition) to measure variation in enthalpy and a temperature at a gelation peak.

The results are shown in Table 2.

TABLE 2

| Acceleration voltage (MeV) | Absorbed dose (kGy) | Under cooling | |
|---|---|---|---|
| | | Enthalpy (J/g) | Temperature (° C.) |
| Unirradiated | | 0.084 | 20.4 |
| 2.5 | 25 | 0.107 | 22.6 |

The results show that the gelation temperature in the course of cooling after heating increased through the electron beam irradiation. The range of the temperature at which the gelation occurs became greater than that of the protein without the irradiation, which indicates that a gelatin capable of gelating in a shorter period was obtained.

Example 3

Powders of albumen (produced by Saneigen F. F. I., Inc., Lot No. 980907, containing 78.1 wt % of protein) were used as a test material and treated in the same manner as in Example 1 except that the absorbed doses were 5, 10 and 25 kGy (current flow: 10.8, 21.4 and 32.1 mA; rate: 50 m/min; irradiation range: 20 cm).

A. Differential Scanning Calorimeter (DSC)

Electron beam irradiated samples and unirradiated samples were subjected to heating and cooling, respectively, to observe variation in enthalpy and a temperature at a gelation peak.

The results are shown in Table 3.

TABLE 3

| Acceleration voltage (MeV) | Absorbed dose (kGy) | Under heating | | Under cooling | |
|---|---|---|---|---|---|
| | | Enthalpy (J/g) | Temperature (° C.) | Enthalpy (J/g) | Temperature (° C.) |
| Unirradiated | | −24.7 | 73.4 | Not detected | |
| 2.5 | 5 | Not detected | | 25.6 | 85.6 |
| 2.5 | 10 | Not detected | | 20.9 | 83.3 |
| 2.5 | 25 | Not detected | | 37.9 | 98.9 |

The unirradiated albumen powders were gelated only under heating, but were not gelated in the course of cooling after the heating. In contrast, the irradiated albumen did not show any change during heating but gelation was observed in the course of cooling after the heating.

Thus, it is shown that albumen which is stable under heating and gelated in the course of cooling after the heating was obtained by the electron beam irradiation.

Example 4

Powders of plasma protein (produced by Saneigen F. F. I., Inc., Lot No. 980907, containing 77.2 wt % of protein) were used as a test material and treated in the same manner as in Example 1 at the dose rate of 5 kGy.

A. Differential Scanning Calorimeter (DSC)

Variation in enthalpy and a temperature at a gelation peak of the electron beam irradiated samples and the unirradiated samples were measured under heating and cooling conditions in the same manner as in Example 3.

The results are shown in Table 4.

TABLE 4

| Accelera-tion volt-age (MeV) | Absorbed dose (kGy) | Under heating | | Under cooling | |
|---|---|---|---|---|---|
| | | Enthalpy (J/g) | Temper-ature (° C.) | Enthalpy (J/g) | Temper-ature (° C.) |
| Unirradiated | | −6.0 | 96.0 | 35.2 | 92.2 |
| 2.5 | 5 | −5.0 | 96.1 | 70.4 | 95.0 |

The results show that the enthalpy increased under cooling after the electron beam irradiation, which indicates that the ratio of the protein gelated during cooling after the heating was nearly doubled.

Thus, a plasma protein which is easily processed under heating and allows manufacture of products with good yield was obtained.

According to the present invention, the protein is irradiated with the electron beam to improve the gelation properties of the protein. In particular, the gelation temperature is raised higher than the inherent gelation temperature, so that a protein which is easily handled and hardly generates lumpiness and viscosity is obtained. Further, with an increase of the ratio of protein molecules to be gelated, water-holding properties of the protein is enhanced. Moreover, the protein is gelated to give a protein gel having these properties.

The electron beam can be used with less industrial costs and an irradiation technique therefor has already been established so that a large amount of protein can be treated by an easy operation.

What is claimed is:

1. A method for changing the gelation temperature of a protein or changing the ratio of protein molecules with gelation properties to whole protein molecules, said method comprising irradiation of the protein with an electron beam with an acceleration voltage in the range of 2.5 to 10 MeV.

2. The method according to claim 1, wherein the improvement of the gelation properties is to raise a gelation temperature of the protein higher than an inherent gelation temperature thereof.

3. The method according to claim 2, wherein the gelation temperature of the protein under heating is raised higher than the inherent gelation temperature.

4. The method according to claim 2, wherein the gelation temperature of the protein in the course of cooling after heating is raised higher than the inherent gelation temperature.

5. The method according to claim 2, wherein the gelation temperature of the protein in the course of cooling after heating is raised higher than the inherent gelation temperature under heating.

6. The method according to claim 1, wherein said ratio of the protein molecules with gelation properties to whole protein molecules is greater than a ratio when said protein molecules are not subject to said irradiation.

7. The method according to any one of claims 1 to 6, wherein the protein is in the form of film, plate, particles or powders.

8. The method according to claim 1, wherein the protein is a concentrate of whey protein, a gelatin, an albumin or a plasma protein.

9. The method according to claim 1, wherein the protein is used as a mixture with a material used in a food manufacturing or processing process.

10. The method according to claim 1, wherein the electron beam irradiation is carried out at an acceleration voltage in the range of 50 KeV to 10 MeV.

11. The method according to claim 1, wherein the acceleration voltage is in the range of 300 KeV to 2.5 MeV.

12. The method according to claim 1, wherein the electron beam irradiation is carried out at a dose rate in the range of $1.0 \times 10^5$ to $1.0 \times 10^9$ Gy/hr.

13. The method according to any-one of claims 1 to 6, wherein the protein in the form of particles or powders is spread in a plastic vessel and irradiated with the electron beam.

14. A protein whose gelling properties have been improved by the method according to claim 1.

15. A method for gelating the protein of claim 14.

16. A product containing the protein according to claim 14 or the protein gelated by the method according to claim 15.

17. The method according to claim 1, wherein said protein is albumin, plasma protein, whey protein or gelatin.

* * * * *